United States Patent
Cho et al.

[11] Patent Number: 5,856,734
[45] Date of Patent: Jan. 5, 1999

[54] DRIVING CIRCUIT OF DIRECT CURRENT BRUSHLESS MOTOR

[75] Inventors: Jae-sung Cho; In-jae Lee, both of Incehon, Rep. of Korea

[73] Assignee: Dongyang Mechatronics Corporation, Incheon, Rep. of Korea

[21] Appl. No.: 734,352

[22] Filed: Oct. 21, 1996

[30] Foreign Application Priority Data

Oct. 25, 1995 [KR] Rep. of Korea .................. 1995-36985

[51] Int. Cl.$^6$ ..................................................... G05B 1/06
[52] U.S. Cl. .......................... 318/652; 310/798; 310/805; 310/812
[58] Field of Search ................................. 318/798–815, 318/652

[56] References Cited

U.S. PATENT DOCUMENTS 4,348,622  9/1982  Inoue ................................. 318/798 X
4,554,990  11/1985  Kamiya et al. ..................... 318/652 X
4,941,445  7/1990  Deutsch ................................. 318/652

*Primary Examiner*—Karen Masih
*Attorney, Agent, or Firm*—Morgan & Finnegan LLP

[57] ABSTRACT

A driving circuit of a direct current brushless motor is provided. The circuit includes a sensing portion, arranged around a rotor, for generating sensing signals according to a position of the rotor, and a stator coil controller for supplying current to each stator coil using the sensing signals, wherein when the rotor is sensed, the sensing portion generates a first sensing signal having a predetermined high-state interval longer than a half rotating period, and a second sensing signal having the predetermined high state interval starting before the high-state of the first sensing signal is finished, and wherein the stator coil controller supplies current to the stator coil during the time when one of the first and second sensing signals is low. Accordingly, since it is not necessary to control phases of rotor sensing signals, the circuit is simplified and consumption power is reduced.

2 Claims, 6 Drawing Sheets

DRIVING CIRCUIT OF DIRECT CURRENT BRUSHLESS MOTOR

BACKGROUND OF THE INVENTION

The present invention relates to a driving circuit of a direct current brushless motor.

FIG. 1 is a block diagram showing a driving circuit of a conventional direct current brushless motor. As shown in FIG. 1, the driving circuit of the conventional direct current brushless motor is provided with sensing parts S1, S2, S3, . . . , and SN arranged around a rotor for generating sensing signals Qs1, Qs2, Qs3, . . . , and QsN according to a position of the rotor, a phase controller 11 for controlling phases of the sensing signal Qs1, Qs2, Qs3, . . . , QsN, stator coil controllers 121, 122, 123, . . . , and 12N for controlling current passing through a stator coil according to output signals Qs11, Qs12, Qs21, Qs22, Qs31, Qs32, . . . , QsN1, and QsN2 of the phase controller 11 and a voltage regulator RE for controlling DC source voltage Vs and supplying predetermined voltage Vc to the sensing parts S1, S2, S3, . . . , Sn and the phase controller 11.

Referring to FIG. 1, rated voltage of the sensing parts S1, S2, S3, . . . , SN and the phase controller 11 is lower than that of the stator coil controllers 121, 122, 123, . . . , and 12N. Accordingly, a resistor R1 for voltage drop is connected to an input terminal of the voltage regulator RE. That is, input voltage of the voltage regulator RE can be obtained by subtracting dropped voltage I•R1 from the DC source voltage Vs, where I is current passing through the resistor R1. Current $I_1$ flowing from the voltage regulator RE toward ground is for supplying the predetermined voltage (Vc). Also, total current $I_2$ of the sensing parts S1, S2, S3, . . . , SN can be obtained by summing current $I_{21}$, $I_{22}$, $I_{23}$, . . . , and $I_{2N}$ passing through a first sensor S1, a second sensor S2, a third sensor S3, . . . , an Nth sensor SN.

FIG. 2 is a timing diagram for illustrating an operation state of the driving circuit of FIG. 1.

Referring to FIG. 2, QsN denotes a sensing signal from the Nth sensor SN of FIG. 1, QsN1 and QsN2 denote signals from the phase controller 11 of FIG. 1 input into an Nth phase stator coil controller 12N of FIG. 1, and V□N denotes voltage applied to the Nth phase stator coil. As shown in FIG. 2, a pulse width of the sensing signal QsN from an nth sensor SN of FIG. 1 is larger by 2θ than a half period π. However, the voltage V□N applied to the stator coil should be less by 2θ than the half period π. Accordingly, the driving circuit of the conventional direct current brushless motor converts output signals S1, S2, S3, . . . , and SN from each sensor into the two signals Qs11, Qs12, Qs21, Qs22, Qs31, Qs32, . . . , QsN1, and QsN2 which are less by 2θ than the half period π, using the phase controller 11 of FIG. 1. Accordingly, the voltage V□N applied to the stator coil of each phase shows a waveform as shown in FIG. 2, to thereby drive the direct current brushless motor.

FIG. 3 is a circuit diagram of the Nth phase stator coil controller of FIG. 1. As shown in FIG. 3, transistors Q1 and Q2 and power transistors Q4 and Q6 are a NPN type, and power transistors Q3 and Q5 are a PNP type, respectively. Accordingly, when the signal QsN1 received from the phase controller 11 of FIG. 1 is high, the transistor Q1 and the power transistors Q3 and Q6 are turned on, so that current of the source voltage Vs passes toward the ground via the power transistor Q3, the Nth phase stator coil □N and the transistor Q6. Also, the signal QsN2 received from the phase controller 11 of FIG. 1 is high, the transistor Q2 and the power transistors Q5 and Q4 are turned on, so that current of the source voltage Vs passes toward the ground via the power transistor Q5, the Nth phase stator coil □N and the power transistor Q4. That is, the voltage V□N applied to the stator coil of each phase shows a waveform as shown in FIG. 2, to thereby drive the direct current brushless motor.

According to the driving circuit of the conventional direct current brushless motor, since the voltage regulator RE and the phase controller 11 are required, the circuit is complicated and much power is consumed.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 4:
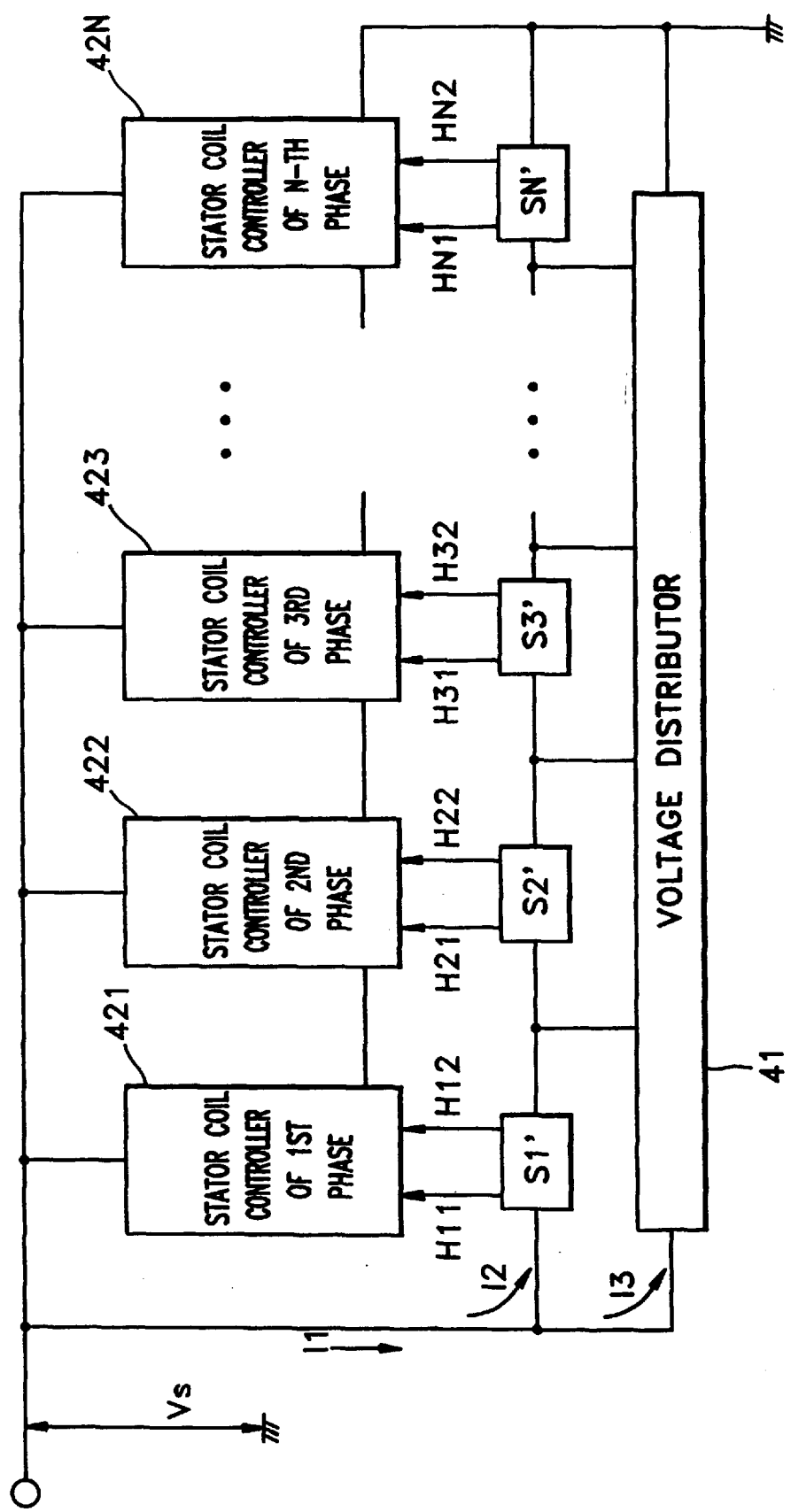
FIG. 4 is a block diagram showing a driving circuit of a direct current brushless motor according to the present invention.

Referring to FIG. 4, a driving circuit of a direct current brushless motor according to the present invention is provided with senors S1', S2', S3', . . . , and SN' arranged around a rotor for generating sensing signals H11, H12, H21, H22, H31, H32, . . . , HN1, and HN2 according to a position of the rotor, stator coil controllers 421, 422, 423, . . . , and 42N for controlling current passing through the stator coil according to each sensing signal H11, H12, H21, H22, H31, H32, . . . , HN1, or HN2 and a voltage distributor 41 for uniformly distributing direct current (DC) source voltage Vs to the sensors S1', S2', S3', . . . , and SN'. Reference character I1 denotes current of the source voltage Vs passing toward the sensors S1', S2', S3', . . . , and SN' and voltage distributor 41, reference character I2 denotes current of the source voltage Vs passing toward the sensors and reference character I3 denotes current of the source voltage Vs passing toward the voltage distributor 41.

Figure 1:
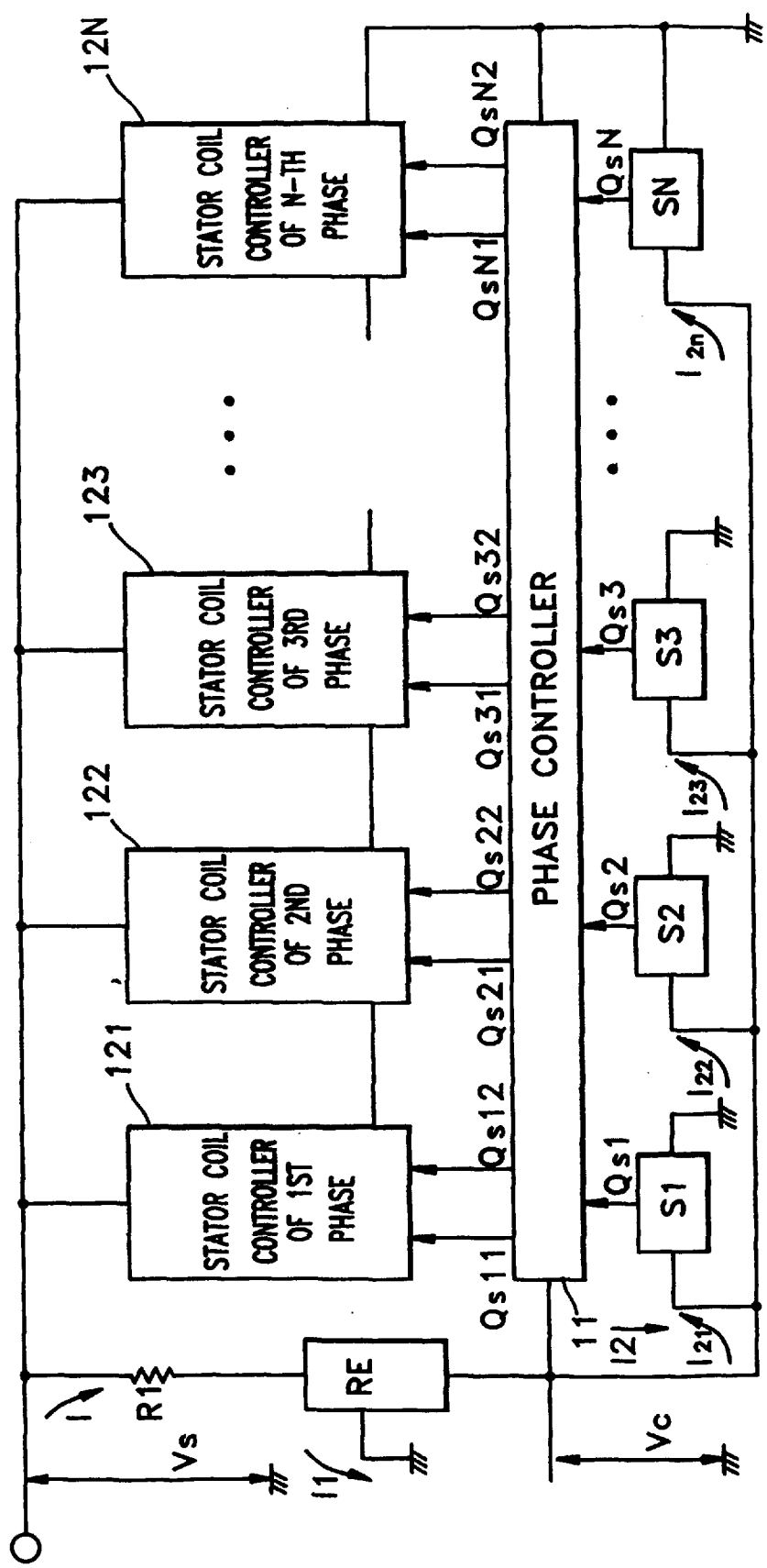
FIG. 1 is a block diagram showing a driving circuit of a conventional direct current (DC) brushless motor.
Figure 2:
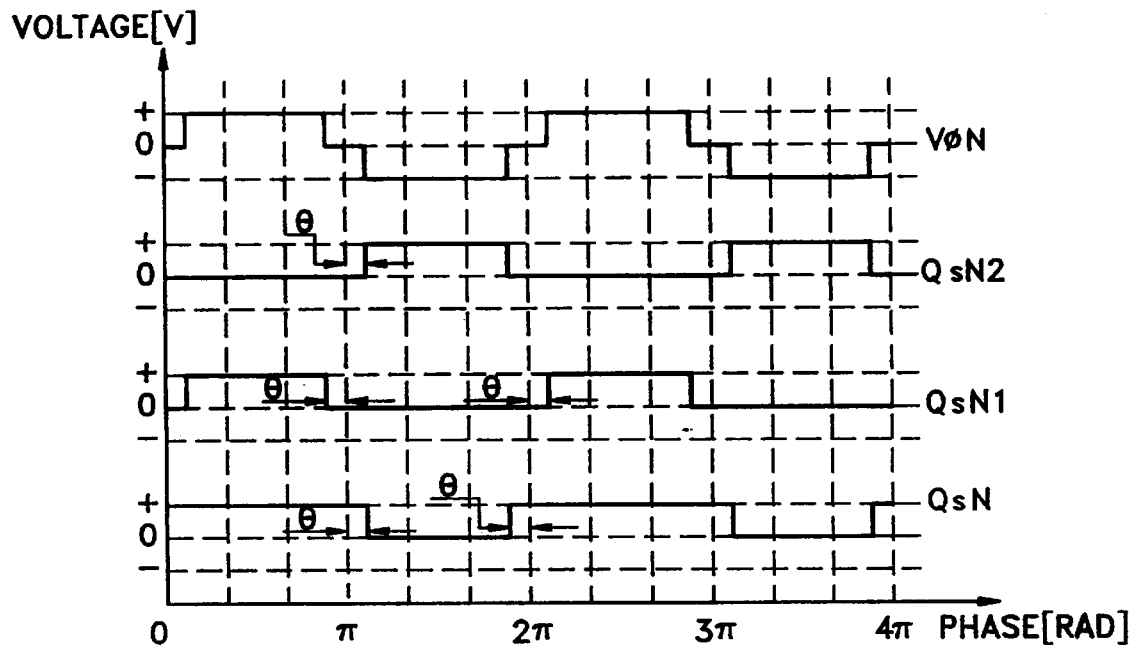
FIG. 2 is a timing diagram for illustrating an operation state of the driving circuit of FIG. 1.
Figure 3:
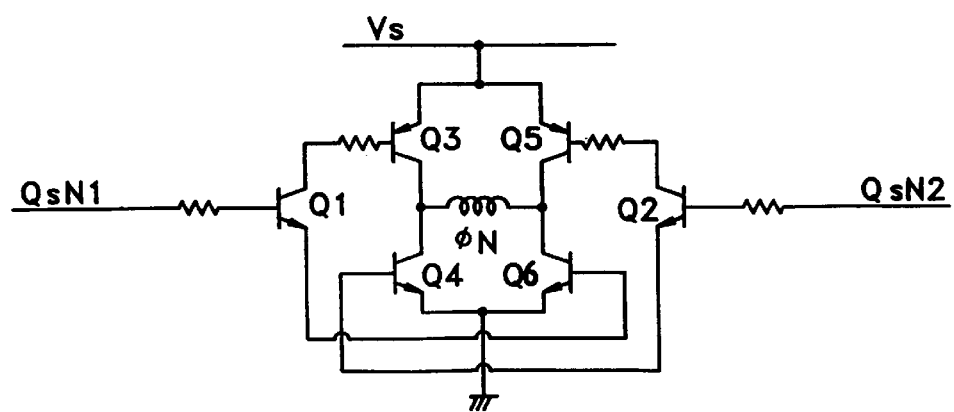
FIG. 3 is a circuit diagram of an Nth phase stator coil controller of FIG. 1.

Referring to FIG. 1, when a rotor is sensed, each sensor S1', S2', S3', . . . , or SN' of FIG. 4, generates first sensing signals H11, H21, H31, . . . , and HN1 having a high-state interval longer than a half rotating period π and second sensing signals H12, H22, H32, . . . , and HN2 having a high-state interval longer than the half rotating period π starting before the high state of the first sensing signal is finished. While one of the first and second sensing signals is low, the stator coil controllers 421, 422, 423, . . . , and 42N supply current to the stator coils.

Figure 5:
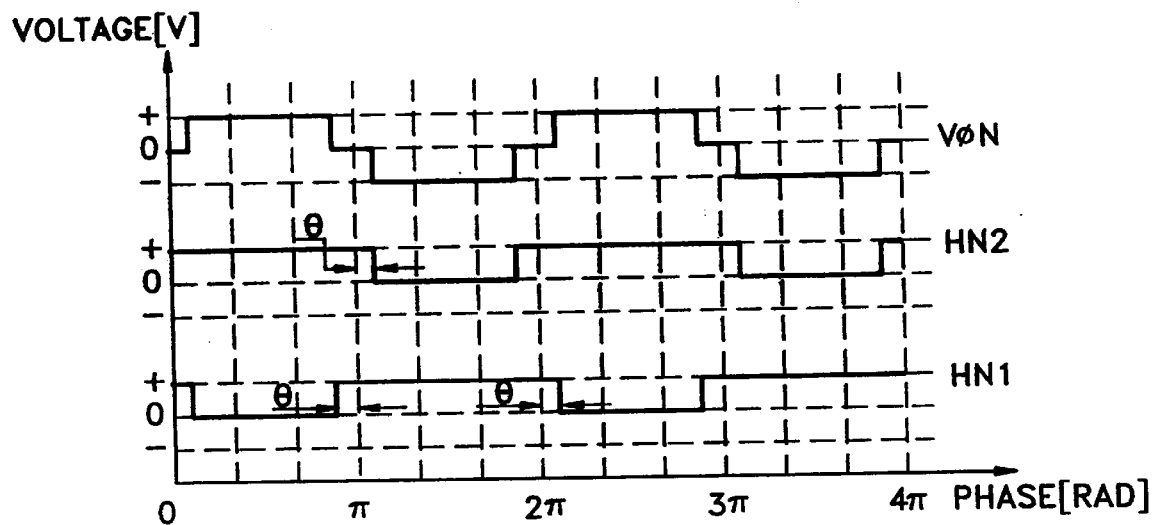
FIG. 5 is a timing diagram for illustrating an operation state of the driving circuit of FIG. 4.

In FIG. 5, reference character HN1 denotes a first sensing signal from the nth sensor SN' of FIG. 4, reference character HN2 denotes a second sensing signal from the nth sensor SN' and V☐N denotes voltage applied to an Nth phase stator coil. As shown in FIG. 5, the Nth sensor SN' generates a first sensing signal HN1 having a high-state interval longer than the half rotating period and a second sensing signal HN2 having a high-state interval longer than the half rotating period starting before the high-state of the first sensing signal is finished when the rotor is sensed. While one of the first and second sensing signals HN1 and HN2 is low, the stator coil controller 424 of FIG. 4 of the Nth phase supplies current to the stator coil. Accordingly, it is not necessary to control phases of the sensing signals H11, H12, H21, H22, H31, H32, . . . , HN1, and HN2. Also, each sensor S1', S2', S3', . . . ,or SN' is in series connected, to thereby relatively reduce current I2 passing toward the sensor.

Figure 6:
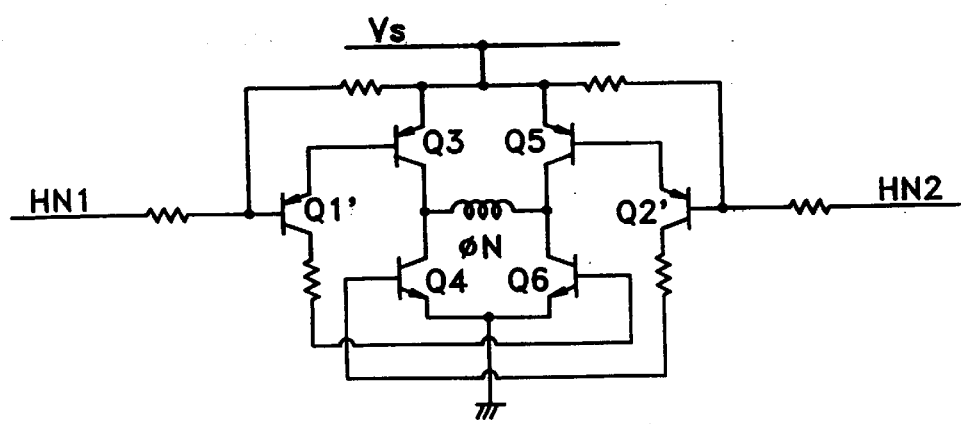
FIG. 6 is a circuit diagram of an Nth phase stator coil controller of FIG. 4.

Referring to FIG. 6, transistors Q1' and Q2', power transistors Q3' and Q5' are a PNP type, and power transistors Q4 and Q6 are a NPN type, respectively. Accordingly, when the first sensing signal HN1 from the Nth sensor SN' is low, the transistor Q1' and the power transistors Q3 and Q6 are turned on, so that current of the source voltage Vs passes toward ground via power transistor Q3, the Nth phase stator coil ☐N and the power transistor Q6. Also, the second sensing signal HN2 from the Nth sensor SN' is low, a transistor Q2' and power transistors Q5 and Q4 are turned-on, so that current of the source voltage Vs passes toward ground via the power transistor Q5, the Nth phase stator coil ☐N and the power transistor Q4. That is, voltage V☐N applied to the stator coil of each phase shows a waveform as shown in FIG. 5, to thereby drive a direct current (DC) brushless motor.

Figure 7:
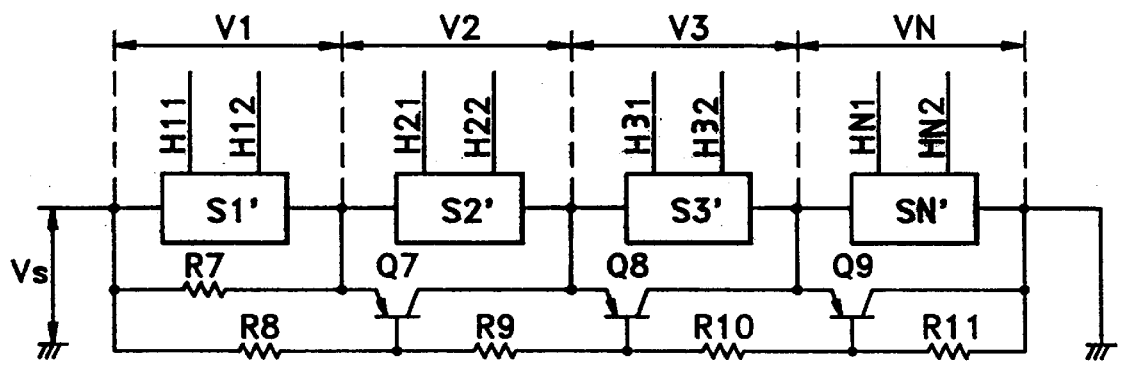
FIG. 7 is a circuit diagram of a voltage distributor of FIG. 4.

Referring to FIG. 7, when the source voltage Vs is applied, transistors Q7, Q8 and Q9 are sequentially turned on by operation of resistors R7, R8, R9, R10 and R11 for bias. Accordingly, voltage V2 applied to the second sensor S2', voltage V3 applied to the third sensor S3' and voltage VN applied to the Nth sensor SN' are the same, which are maintained regularly with respect to changes of the source voltage Vs. Here, voltage V1 applied to the first sensor S1' is determined by resistance of the resistor R7. That is, DC source voltage Vs can be uniformly distributed into each sensor S1', S2', S3', . . . , or SN'. This can be expressed as a formula V1=V2=V3=. . . =VN =Vs/N. Accordingly, sensing signals H11, H12, H21, H22, H31, H32, . . . , HN1, and HN2 from the respective sensor have uniform sizes.

Figure 8:
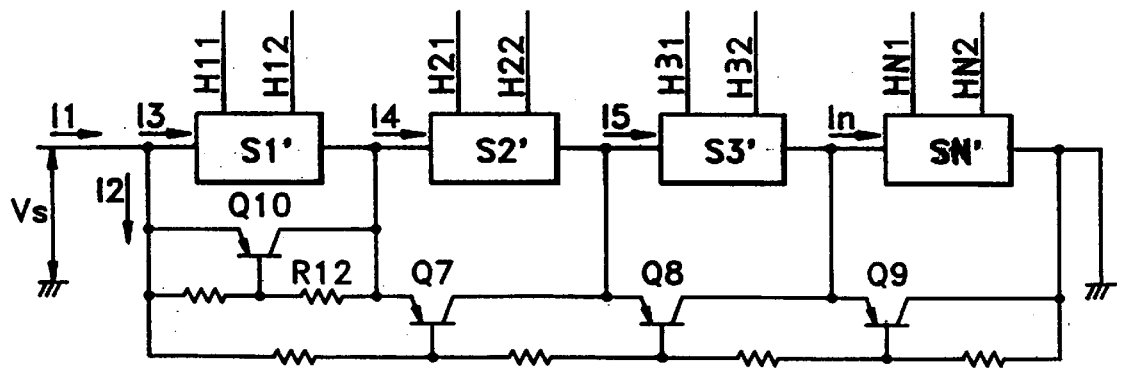
FIG. 8 is a modified circuit diagram of FIG. 7.

Comparing FIG. 8 to FIG. 7, it can be understood that the transistor Q10 and the resistor R12 for bias are added to the first sensor S1'. Accordingly, DC source voltage Vs can be uniformly distributed into each sensor S1', S2', S3∝, . . . , or SN', and current I3, I4, I5, . . . , or IN passing through each sensor S1', S2', S3', . . . , or SN' is maintained regularly with respect to changes of the source voltage Vs.

Figure 9:
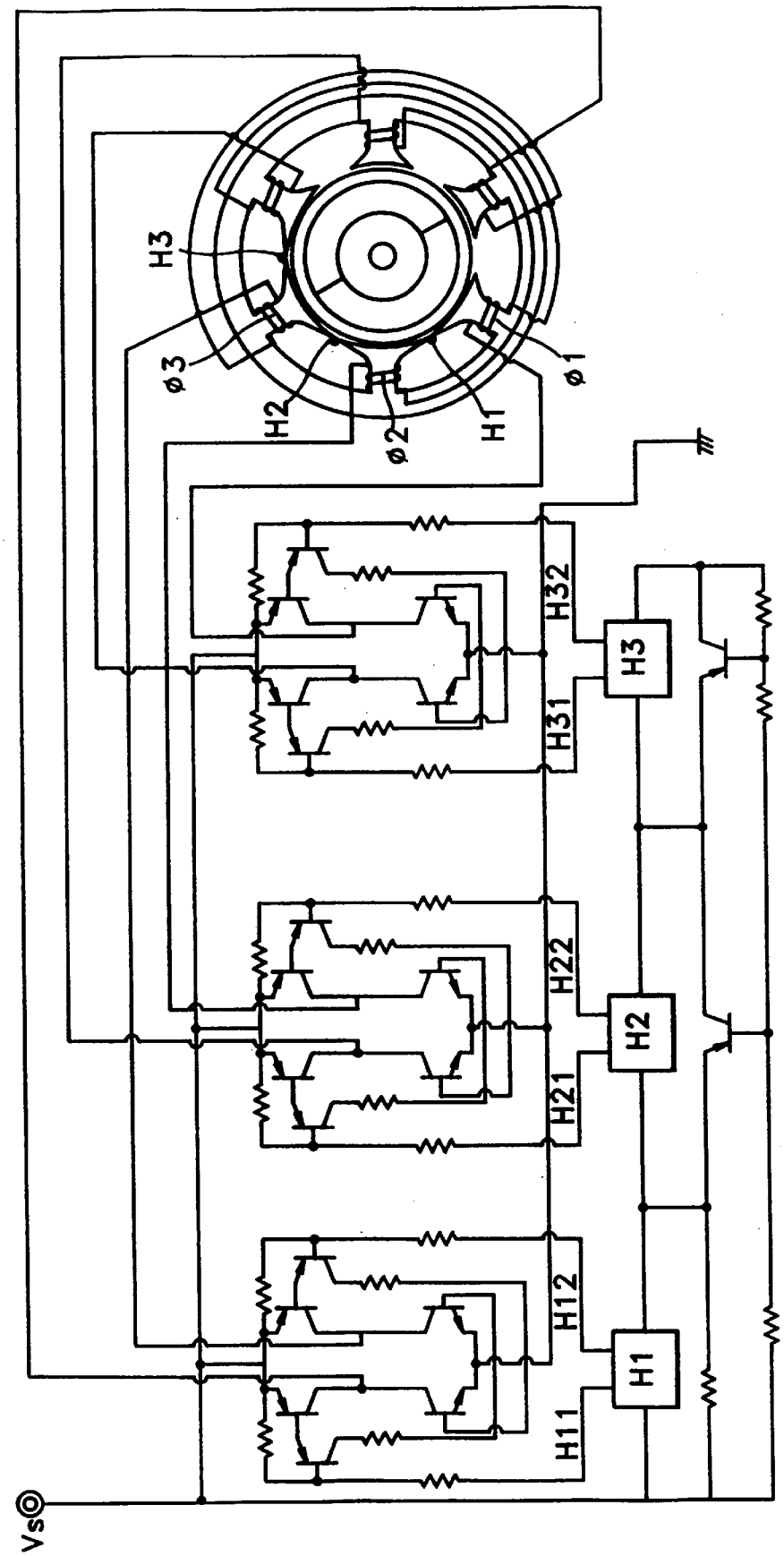
FIG. 9 shows a state that the circuit of FIG. 4 is connected to a three-phase direct current brushless motor.

Referring to FIG. 9, the circuit has the same structure and operation as those described in FIGS. 4, 5, 6 and 7. Thus, it is not necessary to control phases of the sensing signals H11, H12, H21, H22, H31, H31, . . . , HN1, and HN2.

As described above, since the driving circuit of the direct current brushless motor of the present invention does not require to control phases of rotor sensing signals, the circuit is simplified and consumption power is reduced.

It should be understood that the invention is not limited to the illustrated embodiment and many changes and modifications can be made within the scope of the invention by a person skilled in the art.

What is claimed is:

1. A driving circuit of a direct current brushless motor comprising a sensing portion, arranged around a rotor, for generating sensing signals according to a position of said rotor; and a stator coil controller for supplying current to each stator coil using said sensing signals, wherein when said rotor is sensed, said sensing portion generates a first sensing signal having a predetermined high-state interval longer than a half rotating period, and a second sensing signal having said predetermined high state interval starting before said high-state of the first sensing signal is finished, and wherein said stator coil controller supplies current to said stator coil during the time when one of said first and second sensing signals is low.

2. A driving circuit of a direct current brushless motor according to claim 1, further comprising a voltage distributing portion for uniformly distributing direct current source voltage to said sensing portion.

* * * * *